3,701,744
POLYMERIZATION OF UNSATURATED COMPOUNDS WITH SALTS OF ARYLALIPHATIC CARBOXYLIC ACIDS
Layton Frederick Kinney, Villa Park, Ill., assignor to Armour Industrial Chemical Company
No Drawing. Filed Nov. 14, 1967, Ser. No. 682,996
Int. Cl. C08d 1/09; C08f 1/13
U.S. Cl. 260—23.7
7 Claims

ABSTRACT OF THE DISCLOSURE

An improved method for the production of linear polymers by polymerization of ethylenically unsaturated compounds dispersed in an aqueous medium which comprises using an alkali metal salt of an arylaliphatic carboxylic acid as emulsifying agent.

---

Heretofore it has been known that unsaturated organic compounds containing the $CH_2\!=\!C\!<$ group may be copolymerized while dispersed in an aqueous medium using certain fatty acid salts. Thereby, a large number of monomeric materials may be polymerized individually or in various combinations to form relatively high molecular weight polymers. Hereafter in this specification and the appended claims, the term "polymers" will be used in its broadest sense as also including copolymers. Such monomers include the aliphatic conjugated diolefins, such as butadiene-1,3; 2,3-dimethyl-1,3-butadiene; isoprene; chloroprene; methylchloroprene; bromoprene and the like. Also included are the aryl olefins, such as styrene, alpha-methyl-styrene, p-methyl, alpha-methyl-styrene, p-chlorostyrene and the like; as well as acrylic acid, methacrylic acid, methyl acrylate, methyl methacrylate, butyl methacrylate, vinyl acetate, vinyl chloride, vinylidene chloride, acrylonitrile, isobutylene and other unsaturated compounds of this type.

Generally, the fatty acid salts which have previously been used are the potassium or sodium salts of higher fatty acids containing from 14 to 20 carbon atoms in the molecule, such as myristic, palmitic, oleic, stearic acid or mixtures thereof. Many such salts are unsuitable as the acids contain substantial amounts of polyunsaturated fatty acids, which seriously interfere with the polymerization reaction. Salts of polyunsaturated fatty acids slow down the rate of reaction and tend to react with the material being polymerized. Further, the presence of polyunsaturated acids in synthetic rubber interferes with the curing of the rubber. For this reason the potassium salt of hydrogenated tallow fatty acids has been extensively used. Tallow is primarily a mixture of saturated fatty acids containing 14 to 18 carbon atoms per molecule. The potassium salts of hydrogenated tallow fatty acids do produce a relatively fast polymerization rate. However, the hydrogenated tallow fatty acid salts are not sufficiently water-soluble and are quite difficult to remove from the polymerization product.

Further, it is known that the alkali metal salts of aromatized linoleic acid may be used as an emulsifying agent for the polymerization of the above described unsaturated organic compounds, as taught by U.S. Pat. 3,269,968 (1966) issued to Malcolm E. Hannah and assigned to Tenneco Chemicals Inc. Unfortunately these compounds do not produce a fast polymerization rate.

As can be appreciated, a constant demand for better emulsifying agents exists. Therefore it is an object of this invention to provide novel emulsification agents for the emulsion polymerization of water-insoluble, ethylenically unsaturated organic compounds dispersed in an aqueous medium, which emulsification agents do not interfere with the polymerization reaction, are easily redissolvable in water and produce a fast polymerization rate. Another object is to provide an improved process for the emulsion polymerization of water-insoluble, ethylenically unsaturated organic compounds while dispersed in an aqueous medium using arylaliphatic carboxylic acid salts as the emulsifying agents. It is a further object to provide such an improved process having unusually fast reaction times, thus permitting costs savings due to decreased manufacturing time and increased product throughputs.

The above objects, and others which will become apparent upon reading the specification and examples which follow, are achieved by the use of an emulsifying agent having the formula:

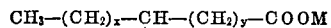
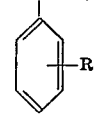

wherein $x$ and $y$ each are integers ranging from 0 to 18 and whose sum is an integer ranging from 7 to 18; M is an alkali metal radical such as sodium or potassium; and R is a member of the group consisting of hydrogen, methyl, hydroxy and methoxy radicals. These compounds contain one or more long chain aliphatic groups to which an aryl group is attached as a side chain, thereby providing an aralkyl or arylaliphatic group. They may be prepared by first arylating long chain fatty acids, such as oleic or palmitoleic acid or stearic acid, by known procedures. The arylated fatty acid may then be converted to the alkali metal salt by reacting the acid with a basic alkali substance including the alkali oxides, hydroxides, and carbonates, of which potassium hydroxide is usually preferred.

The carbon atom to which the aryl group is attached varies due to double bond migration in the unsaturated fatty acids; thereby resulting under most reaction conditions in a mixture of isomeric products. The particular location of the aryl group in any given instance does not appear to affect the emulsifier's efficacy.

The emulsion polymerization of the monomeric material may be carried out with the present salts in the same manner as when the heretofore known salts have been used; and a batch-type, semi-continuous, or continuous process may be used.

In addition, various additives will generally be used to promote the reaction, control the chain length of the polymer, and produce a polymer having the desired properties. The additives to be used may vary depending upon the particular monomer or polymer being polymerized and other fatcors. For example, in the polymerization of butadiene-1,3 and styrene, the emulsion may also contain in addition to the present salt, a modifying agent such as an alkyl mercaptan, an activator such as alkali metal pyrophosphate-ferrous salt compositions and a peroxide-type catalyst such as triisopropylbenzene hydroperoxide. Other known additives may be present for other purposes or in substitution with the above-mentioned additives.

While formulations for the emulsions according to the present invention may vary somewhat and depend to some extent upon the characteristics of the various individual ingredients, a preferred formulation for preferred synthetic resin-in-water emulsions is as follows:

| Ingredient: | Parts by weight |
|---|---|
| Butadiene | 70 |
| Styrene | 30 |
| Water | 200 |
| Phenylstearic acid | 4.5 |
| KOH | 0.71 |
| $FeSO_4 \cdot 7H_2O$ | 0.41 |
| $K_4P_2O_7$ | 0.167 |
| Versene (the sodium salts of ethylenediamine tetraacetic acid, manufactured by Dow Chemical Co.) | 0.01 |
| Tamol N (the sodium salt of an aryl sulfonic acid, manufactured by Rhom & Haas Co.) | 0.15 |
| $Na_3PO_4 \cdot 12H_2O$ | 0.5 |
| Paramenthane hydroperoxide | 0.1 |
| Dodecyl mercaptan | Variable |

This invention is still further illustrated by the following examples, which are not to be construed in any way or manner as imposing limitations upon the scope thereof. On the contrary, it is to be clearly understood that resort may be had to various other embodiments, modifications and equivalents thereof which readily suggest themselves to those skilled in the art without departing from the spirit or scope of the present invention and the appended claims.

EXAMPLE I

The hereinabove preferred formulation was used, which is typical of those used both for production and laboratory studies. The major change in going from laboratory to production work is in the catalyst, activator, and modifier concentrations. In the basic formulation, a 5% excess of KOH was used, based on the acid number of the phenylstearic acid, to insure that the reaction mixture stayed on the pH range of 9–10.

The polymerization reactions were carried out in No. 32-oz. soda bottles rotated end-over-end at a speed of 35 r.p.m. in a large water bath. This bath was equipped with a refrigeration unit which maintained it at a constant temperature of 41° F. The bottles were equipped with self-sealing caps, so that samples could be withdrawn with a hypodermic needle at any time during the reaction.

The bottles were charged by first dissolving the phenylstearic acid and KOH in hot distilled water and adding them to the bottle along with all of the other water-soluble ingredients except the ferrous sulphate and potassium pyrophosphate. The dodecyl mercaptan and paramenthene hydroperoxide were dissolved in the sytrene, and the solution added to the bottle, forming a layer which floated on the water. An excess of freshy distilled butadiene was then added, and the excess allowed to boil off to remove the air from the bottle. The bottle was then capped and placed in the polymerizer at 41° F. for ½ hour to cool. At this time, the activator slurry prepared from the ferrous sulfate and potassium pyrophosphates was added with a hypodermic syringe. The time of addition of activator was counted as the start of the reaction.

Once the reaction has started, the degree of conversion was periodically determined by sampling the bottles to determine their solids content. With the basic recipe used, a solids content of 21.4% corresponds to a 60% conversion. At the time that a 60% conversion was reached, the bottle was removed from the polymerizer and 0.1 phr. (parts per hundred parts resin) of potassium dimethyl dithiocarbamate was added to terminate the reaction and the final reaction time was recorded. The rubber latex was then steam distilled to remove the excess butadiene and styrene. Table I sets forth the polymerization data, including the periodic measurements of solids percentage, final solids percentage, and final reaction time.

TABLE I.—POLYMERIZATION DATA

| Bottle No.: | DDM (phm.)[1] | Solids, percent (hour)— | | | | | | Final reaction time, hours | Final solids, percent |
|---|---|---|---|---|---|---|---|---|---|
| | | 1½ | 2 | 2¼ | 2½ | 2¾ | 3¼ | 4 | | |
| 3 | 0.20 | | | | | | | 20.3 | 4½ | 22.6 |
| 4 | 0.20 | | | | | | | 21.4 | 4½ | 24.0 |
| 7 | 0.22 | | 16.6 | | | 20.6 | | | 3¼ | 23.0 |
| 8 | 0.24 | | 17.0 | | | (?)13.8 | | | 3¼ | 23.6 |
| 9 | 0.26 | | 18.4 | | | 23.3 | | | 3¼ | 26.4 |
| 10 | 0.28 | | 18.2 | | | 22.9 | | | 3¼ | 26.0 |
| 13 | 0.24 | 14.1 | | | 17.7 | | | | 3 | 18.4 |
| 14 | 0.26 | 15.3 | | | 19.5 | | | | 3 | 21.5 |
| 15 | 0.28 | 15.4 | | | 19.8 | | | | 3 | 21.7 |
| 16 | 0.30 | 17.2 | | | | | | | 2½ | 20.0 |
| 17 | 0.40 | 16.1 | | 18.7 | | | | | 3 | 23.5 |
| 18 | 0.40 | 16.2 | | 18.8 | | | | | 3 | 21.5 |
| 19 | 0.40 | 14.7 | | 18.2 | | | | | 3 | 20.8 |
| 20 | 0.40 | 15.8 | | 21.0 | | | | | 3 | 24.5 |
| 21 | 0.40 | 15.0 | | 18.5 | | | | | 3 | 22.2 |
| 22 | 0.40 | 17.8 | | | | | | | 2½ | 22.8 |
| 23 | 0.35 | 14.6 | | | 18.6 | | | | 3¼ | 20.3 |
| 24 | 0.35 | 14.8 | | | 18.7 | | | | 3¼ | 20.1 |
| 25 | 0.35 | 14.7 | | | 16.7 | | 17.7 | | 5 | 19.4 |
| 26 | 0.35 | 13.0 | | | 17.7 | | | | 3½ | 17.2 |
| 27 | 0.35 | 15.1 | | | 16.5 | | 17.2 | | 5 | 18.4 |
| 28 | 0.35 | 14.2 | | | 16.9 | | | | 5 | 18.7 |
| 29 | 0.27 | 15.0 | | | 18.7 | | | | 3 | 22.6 |
| 30 | 0.27 | 15.0 | | | 20.0 | | | | 3 | 22.6 |
| 31 | 0.27 | 15.5 | | | 20.0 | | | | 3 | 23.8 |
| 32 | 0.27 | 16.7 | | 20.4 | | | | | 2¾ | 22.2 |
| 33 | 0.27 | 17.2 | | 20.8 | | | | | 2¾ | 22.4 |
| 34 | 0.27 | 17.5 | | 21.8 | | | | | 2¾ | 24.7 |

[1] Parts per hundred monomer.

EXAMPLE II

The steamed distilled latexes of bottle Nos. 23, 27, 17 and 22 of Example I were stabilized by adding 1.5 phr. of phenylbetanaphthylamine as an antioxidant. The stabilized latexes were then coagulated with 5% sodium chloride and 0.25% sulfuric acid, washed to remove impurities, and dried in a circulating air oven at 150° F.

The dried polymer from each bottle was then combined and compounded into the following ASTM recipe, using a laboratory rubber mill:

ASTM recipe

| | |
|---|---|
| Polymer | 100 |
| Easy process channel carbon black | 40 |
| Zinc oxide | 5 |
| Stearic acid | 1.5 |
| Sulfur | 2 |
| Benzothiazyl disulfide | 3 |

Prior to the addition of the sulfur and benzothiazyl disulfide, a portion of each batch of the dried polymer was set aside for later use in tack strength measurements. Sample sheets of the polymer measuring 6 x 0.075 inches were cured in a steam press for stress-strain measurements (ASTM D–412 method) and hardness testing (ASTM D–314 method). The stress-strain measurements were made on a Scott Tester at 20 inches per minute, and hardness was measured with a Shore A-2 Durometer. Compression set pieces were also molded for the measurement of compression set according to ASTM method D-395, using the constant deflection technique. Mooney viscosity measurements were made on the raw polymer in accordance with ASTM method D-1646.

Tack strength measurements were made following the procedure outlined by Forbes and McLeod (Transactions of the Institution of the Rubber Industry, 34, 154; 1958) in a brass cylinder 2 inches long, lined with a 3/8 inch inside diameter Teflon bushing and brass caps at each end to apply pressure. The polymer was cut into two circular pieces, each about 1 inch long and slightly less than 3/8 inch in diameter. A 3/8 inch diameter Teflon disc was placed between the two pieces, and the disc and polymer pieces were inserted into the mold and molded for 5 minutes at 230° F. and 1,000 p.s.i. pressure. After molding the Teflon disc was removed and a piece of friction tape was wrapped around the end of each molded disc opposite the face which had been against the Teflon disc. Tack measurements were made on the Instron Tester using a special jig as described by Forbes and McLeod, modified so that the samples were held in place in two small drill press chucks, the chucks clamping the ends wrapped with the friction tape. The smooth ends of the sample, which had been in contact with the Teflon disc during molding, were brought together under a constant pressure of 10 p.s.i., and peeled apart at a rate of 10 inches per minute. The force required to pull the samples apart was recorded and the maximum force was then calculated in pounds-per-square-inch tack strength.

The results of the above testing, in comparison to a commercially available styrene-butadiene rubber having a molecular weight of 1500, are set forth in Table II. The tack strength measurements for different periods of contact, in comparison with a rosin acid emulsified rubber and a tallow acid emulsified rubber, are set forth in Table III.

TABLE II.—PHYSICAL PROPERTIES OF POLYMER VULCANIZATES

| Polymer type | Phenylstearic acid salt blend | | Commercial styrene-butadiene of 1,500 molecular weight | |
|---|---|---|---|---|
| Mooney viscosity of polymer (ML1+4 at 212° F.) | | | | |
| | 37 | | 50-60 | |
| Cure, min. at 302° F. | 15 | 30 | 60 | 30 | 60 |
| 100% modulus, elongation p.s.i. | 80 | 200 | 320 | 90 | 190 |
| 300% modulus, elongation p.s.i. | 980 | 1,540 | 1,860 | 690 | 1,290 |
| Tensile strength, p.s.i. | 2,740 | 2,180 | 2,310 | 3,550 | 3,670 |
| Elongation, percent | 530 | 380 | 370 | 740 | 550 |
| Hardness, Shore A-2 | 62 | 65 | 67 | 62 | 63 |
| Compression set, (22 hours at 158° F.) | | 16 | | | |

TABLE III.—EFFECT OF EMULSIFIER ON TACK STRENGTH OF POLYMER

| | Tack strength (p.s.i.) | | |
|---|---|---|---|
| Emulsifier | Phenylstearic acid salt (Mooney viscosity 37) | Rosin acid salt (Mooney viscosity 50-60) | Fatty acid salt (Mooney viscosity 50-60) |
| 30-second contact | 21 | 20 | 4 |
| 1-minute contact | 16 | 42 | 12 |
| 2-minute contact | 16 | 50 | 10 |
| 3-minute contact | 25 | 54 | 16 |
| 5-minute contact | 25 | 56 | 15 |
| 15-minute contact | 26 | | 26 |
| 30-minute contact | 38 | | 39 |
| 60-minute contact | 44 | | 44 |

From Table III it can be seen that tack strength generally resulting depends upon the contact time and the particular emulsifier used; and that the rosin acid polymer is superior to the tallow acid polymer, especially at the short contact times. It is well established in the rubber industry that styrene-butadiene rubber emulsified with tallow acid soaps is very deficient in building tack, while polymer prepared from rosin acid is much better in this respect. The tack strength of the polymer blend produced from the samples in Example I was about midway between the rosin acid emulsified polymer and the tallow acid emulsified polymer. The polymer of the present invention has the higher tack strength of the rosin acid polymer at the shortest contact times, but is about equal to the tallow acid polymer at the longest contact times. It should be noted that the Mooney viscosity of the polymer blend produced from the phenylstearic acid salt and used in these tack tests was 37, which is a lower molecular weight material than was used in the comparative polymers of Table III. Further, it can be seen in Table II that both the tensile strength and hardness is low in the polymer blend prepared from Example I. This would be expected because of the lower molecular weight.

While this invention has been described with respect to specific embodiments and preferred butadiene-styrene compositions, it is not so limited and it is to be understood that variations and modifications thereof, obvious to those skilled in the art, including the substitution of similar monomers and polymers for the butadiene and styrene, may be made without departing from the spirit or scope of this invention.

What is claimed is:

1. In the production of linear polymers by polymerization of water insoluble, unsaturated organic compounds containing the

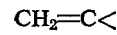

group while dispersed in an aqueous medium in the presence of an emulsifying agent under polymerization conditions, the improvement which consists of incorporating in said aqueous medium prior to polymerization, as an emulsifying agent, an alkali metal salt of arylaliphatic carboxylic acid, represented by the formula:

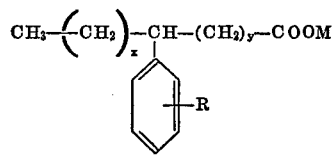

wherein $x$ and $y$ each are integers ranging from 0 to 18 and whose sum is an integer ranging from 7 to 18; M is an alkali metal radical selected from the group consisting of sodium and potassium; and R is a member of the group consisting of hydrogen, methyl, hydroxy and methoxy radicals.

2. The process of claim 1 in which said arylaliphatic carboxylic acid salt is a salt of phenylstearic acid.

3. The process of claim 1 in which said alkali metal is potassium.

4. The process of claim 1 in which said alkali metal is sodium.

5. The process of claim 1 in which said emulsifying agent is the potassium salt of phenylstearic acid.

6. The process of claim 1 in which said emulsifying agent is the sodium salt of phenylstearic acid.

7. In the production of styrene-butadiene polymers by polymerization of styrene and butadiene while dispersed in an aqueous medium in the presence of an emulsifying agent under polymerization conditions, the improvement which consists of incorporating in said aqueous medium prior to polymerization, a minor but effective emulsifying amount of the potassium salt of phenylstearic acid.

References Cited

UNITED STATES PATENTS

| | | | |
|---|---|---|---|
| 2,548,802 | 4/1951 | Linscott | 260—85.1 |
| 2,876,203 | 3/1959 | Miller et al. | 260—23.7 |
| 3,269,968 | 8/1966 | Hannah, Jr. | 260—23.7 |

OTHER REFERENCES

"Dictionary of Organic Compounds," vol. 4, 1965, pp 2705 and 2706.

MAURICE J. WELSH, JR., Primary Examiner

R. A. WHITE, Assistant Examiner

U.S. Cl. X.R.

260—23, 27, 29.6, 29.7, 41.5, 79.5, 84.3, 85.1